(12) United States Patent
Eigel et al.

(10) Patent No.: US 11,912,283 B2
(45) Date of Patent: Feb. 27, 2024

(54) DETECTION OF A HANDS-OFF CONDITION THROUGH MACHINE LEARNING

(71) Applicant: Volkswagen Aktiengesellschaft, Wolfsburg (DE)

(72) Inventors: Thomas Eigel, Berlin (DE); Felix Stahl, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 895 days.

(21) Appl. No.: 16/931,351

(22) Filed: Jul. 16, 2020

(65) Prior Publication Data
US 2021/0024075 A1    Jan. 28, 2021

(30) Foreign Application Priority Data
Jul. 25, 2019   (DE) .......................... 102019211016.9

(51) Int. Cl.
| | | |
|---|---|---|
| *B60W 40/08* | (2012.01) | |
| *B60W 40/06* | (2012.01) | |
| *B60W 50/00* | (2006.01) | |
| *G06V 20/56* | (2022.01) | |

(52) U.S. Cl.
CPC ............ *B60W 40/08* (2013.01); *B60W 40/06* (2013.01); *B60W 50/0097* (2013.01); *G06V 20/588* (2022.01); *B60W 2040/0818* (2013.01); *B60W 2420/24* (2013.01); *B60W 2510/202* (2013.01)

(58) Field of Classification Search
CPC .. B60W 40/08; B60W 40/06; B60W 50/0097; B60W 2040/0818; B60W 2420/24; B60W 2510/202; B60W 2050/0018; B60W 2540/223; B60W 2552/00; B60W 2552/53; G06V 20/588; G06N 3/08
USPC .............................................................. 701/1
See application file for complete search history.

(56) References Cited

U.S. PATENT DOCUMENTS

| | | |
|---|---|---|
| 7,164,117 B2 | 1/2007 | Breed et al. |
| 9,604,649 B1 | 3/2017 | Pastor et al. |
| 2004/0039509 A1 | 2/2004 | Breed |

FOREIGN PATENT DOCUMENTS

| | | |
|---|---|---|
| DE | 102008042277 A1 | 4/2010 |
| DE | 102010033744 A1 | 5/2012 |
| DE | 102011013023 A1 * | 9/2012 |
| DE | 102011013023 A1 | 9/2012 |
| DE | 102011109711 A1 | 2/2013 |
| DE | 102013224512 A1 | 6/2015 |
| DE | 102017216887 A1 | 3/2019 |
| EP | 3075618 A2 | 10/2016 |
| WO | 2015200224 A | 12/2015 |

\* cited by examiner

*Primary Examiner* — Maceeh Anwari
(74) *Attorney, Agent, or Firm* — Peter Zura; LOZA & LOZA, LLP

(57) ABSTRACT

Technologies and techniques for automatically generating labeled steering torque data, with which an artificial intelligence (AI) unit is trained to detect hands-off conditions when the vehicle is being operated.

15 Claims, 2 Drawing Sheets

DETECTION OF A HANDS-OFF CONDITION THROUGH MACHINE LEARNING

RELATED APPLICATIONS

The present application claims priority to European patent app. no. EP19186582.3 to Viktor Bader, filed Jul. 16, 2019, the contents being incorporated by reference in their entirety herein.

BACKGROUND

The present disclosure relates to a process for compiling training data, a data storage medium, a process for training an adaptive algorithm, a process for operating a driver assistance system, a driver assistance system, and a vehicle according to the various aspects disclosed herein.

In the automotive industry, in particular motor vehicles, monitoring the steering activity of a driver is known to be problematic. A wide variety of safety-relevant conclusions can be drawn from the steering activity. A particularly important aspect of this is the detection of hands-off conditions, for example, moments when the driver's hands are not on the steering wheel.

Evaluation of steering torque curves, for example, and an analytical examination of indications of a hands-off condition, are known approaches. These approaches are only reliable and precise to a certain extent, however.

The use of capacitive distance sensors, for example, that detect the hands-off condition directly, also forms known solutions. These solutions are extremely precise, but they are associated with a great number of technological problems.

U.S. Pat. No. 9,604,649 B1 describes a process for checking, for example, whether a driver's hands are on the steering wheel. An interference signal is generated for this on the steering wheel, and a steering torque is measured.

A process is described in DE 10 2008 042 277 A1 in which the steering torque curves are examined with a machine learning approach, for example, a neural network, for special properties that indicate situations in which the hands are on the steering wheel or not on the steering wheel.

A system for checking an occupant restraint system is known from US 2004/0039509 A1 that functions with a machine learning approach.

Such machine learning based solutions have weaknesses in the generation and validation of training data. The generation of training data is extremely complicated, because an extremely large number of possible steering torque curves must be linked to information regarding whether or not there is a hands-off condition. This is referred to as "labeling" the steering torque curves. There is also no uniform evaluation criteria with manual labeling for where to define the boundary between a hands-off condition and a hands-on condition.

Aspects of the present disclosure are therefore directed to an improved approach to machine learning in order to resolve at least some of the aforementioned problems.

BRIEF DESCRIPTION OF THE DRAWINGS

The present disclosure shall be explained below in reference to exemplary embodiments based on the associated drawings. Therein.

DETAILED DESCRIPTION

Figure 1:
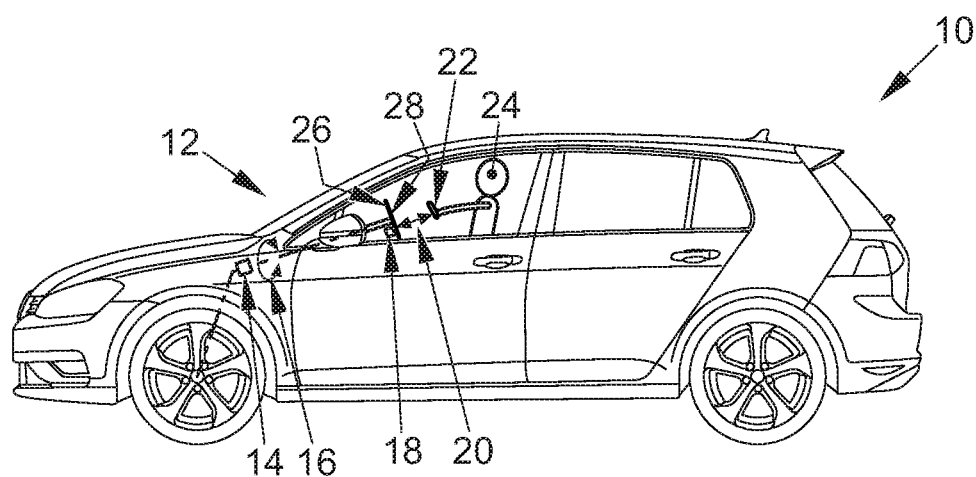
FIG. 1 shows a vehicle according to an example of a process according to the present disclosure for compiling training data.
Figure 1:
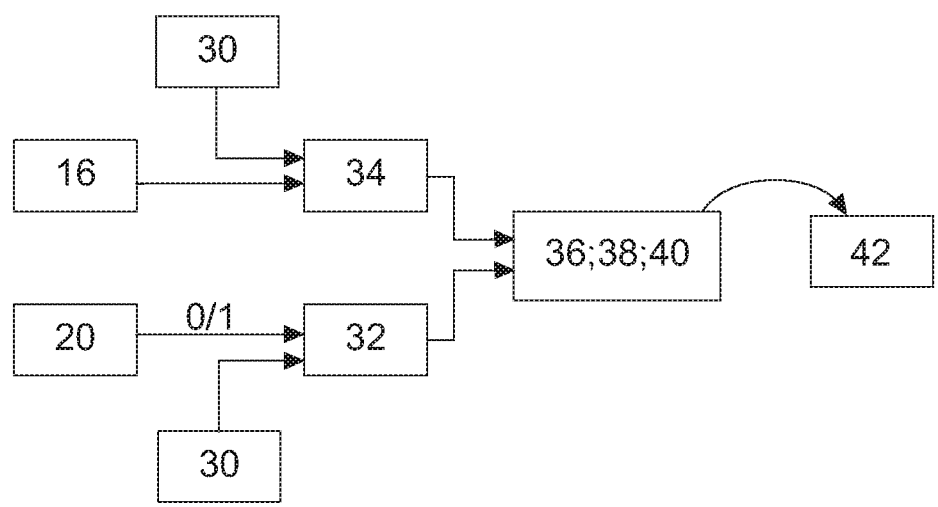

FIG. 1 shows a vehicle 10 according to the present disclosure, which has a driver assistance system 12 according to the present disclosure.

In some examples, a process is disclosed for generating training data suitable for training a driver assistance system to detect a hands-off situation in a vehicle on the basis of an adaptive algorithm, where the process may include: driving a vehicle equipped with a driver assistance system that records steering torque data with sensors while the vehicle is moving, and also records at least distance data representing the distance between a driver's hands and the steering wheel; detecting hands-off situations from at least the measured distance data; and linking the detected hands-off situations with the steering torque data in the time intervals of detected hands-off situations in order to compile labeled steering torque data as training data.

The distance data obtained through sensors relating to the distance of the hands to the steering wheel can also be used as a basis for information, regarding whether or not a hands-off situation exists. In some examples, a threshold value may be set for a signal level from the sensors that are used. Each time the threshold value is exceeded, for example, an automatic evaluation can take place, indicating that a hands-off situation exists. This evaluation can be synchronized with the measured steering torque data, for example, using time stamps. As a result, the time intervals of hands-off situations can be clearly assigned to the same time intervals in the signal curve for the steering torques.

An arbitrary number of training data can therefore be automatically generated while the vehicle is moving under real conditions. The evaluation of the hands-off situation may be uniform and reproducible in this case.

In some examples, sensors are used for obtaining distance data from a capacitive distance sensor.

These sensors should be precise and can also be readily integrated in the steering wheel.

In another example, additional data are drawn on for detecting the hands-off situation, from the group including, but not limited to: steering wheel movement data; data describing the course of the roadway; lane detection data; vehicle movement data.

As such, the distance data from the distance sensors can be examined, in addition to the determined threshold value, with regard to hands-off situations, with supplementary information sources, in order to increase the validity of the detection in the proximity of the threshold value.

In other words, the present disclosure relates to a process for automatically generating labeled steering torque data with which an artificial intelligence (AI) unit can be trained to detect hands-off situations while a vehicle is moving.

In some examples, a data storage medium is disclosed on which training data that have been generated in a process according to the present disclosure for compiling training data in accordance with the present disclosure are stored. The data storage medium is also referred to herein as a training data storage medium.

The data storage medium can be any data storage medium, preferably a digital storage medium, for example, a flash drive.

In some examples, a process is disclosed for training an adaptive algorithm in which training data are used that have been generated in a process according to the present disclosure for compiling training data in accordance with the preceding description, or stored on a training data storage medium according to the present disclosure in accordance with the preceding description.

The adaptive algorithm my include, for example, a neural network that processes the labeled steering torque curves for learning purposes.

Another aspect of the present disclosure relates to a data storage medium on which an adaptive algorithm is stored that has been trained in a process according to the present disclosure in accordance with the preceding description. The data storage medium is also referred to as an algorithm data storage medium.

Another aspect of the present disclosure relates to a process for operating a driver assistance system in which a hands-off situation is detected on the basis of an adaptive algorithm. The process may include the steps of driving a vehicle equipped with a driver assistance system that records steering torque data with sensors while the vehicle is moving; and detecting a hands-off situation from the acquired steering torque data using a trained adaptive algorithm.

In some examples, the trained adaptive algorithm may be trained on the basis of training data generated in a process as disclosed herein for compiling training data, and/or trained using a training data storage medium according to the present disclosure, and/or trained in a process according to the present disclosure for training an adaptive algorithm, and/or stored on an algorithm data storage medium according to the present disclosure.

The drive assistance system supplies the trained adaptive algorithm with the measured unlabeled steering torque data as input, upon which the adaptive algorithm that has been trained with the labeled steering torque data determines whether a hands-off situation exists.

The quality of the detection in the process according to the present disclosure is typically much higher than with conventional processes, without experiencing a great deal of technological difficulty.

In particular, a distance sensor is not required in the vehicle for detecting hand placement, as well as detecting hands-off situations when the vehicle is being used by a user.

Another aspect of the present disclosure relates to a driver assistance system configured to execute a process according to the present disclosure for compiling training data, or for populating a training data storage medium, or for executing a process according to the present disclosure for training an adaptive algorithm, or for populating an algorithm data storage medium according to the present disclosure in accordance with the present description.

Another aspect of the present disclosure relates to a driver assistance system configured to execute a process according to the present disclosure for operating a driver assistance system in which a hands-off situation is detected in a vehicle on the basis of a trained adaptive algorithm.

Another aspect of the present disclosure relates to a vehicle comprising a driver assistance system according to the present disclosure.

The vehicle can preferably be a motor vehicle, particularly preferably an automobile or truck.

The various embodiments of the present disclosure specified in this patent application can be combined advantageously with one another, as long as not otherwise individually specified.

Turning back to FIG. 1, a driver assistance system 12 comprises various components distributed in the vehicle 10. The components include a steering torque sensor 14, which can acquire steering torque data 16. The driver assistance system 12 also comprises a capacitive distance sensor 18, which can measure distances 20 between the hands 22 of a driver 24 and a steering wheel 26 in the vehicle 10.

The driver assistance system 12 can be operated in a process according to the present disclosure as follows:

While the vehicle 10 is moving, steering torque data 16 are acquired with the steering torque sensor 14, and the distance data 20 are acquired by the distance sensor 18. The initial state is depicted below the vehicle 10 in the form of a block diagram.

Hands-off conditions are determined from the recorded distance data 20. By way of example, a hands-off condition can be detected and encoded with a logical one, when the hands 22 of the driver 24 are further from the distance sensor 18 than a distance to the surface 28 of the steering wheel 26 measured by the distance sensor 18. Otherwise, a zero indicates that a hands-off condition does not exist.

The block diagram shows how these encoded states are provided with time stamps 30 in the cycles of a sampling rate for the distance sensor 18, and temporarily stored by the driver assistance system 12 as an intermediate result 32.

At the same time, the steering torque data 16 are given the same time stamps 30 and temporarily stored by the driver assistance system 12 as an intermediate result 34.

In a further step, the intermediate result 34 is linked to the intermediate results 32. At this point, the steering torque data 16 for each time interval, which are formed between each pair of successive time stamps 30, are each assigned the logical encoding of the distance data 20 for the same time interval. The time stamps 30 are thus eliminated in the result 36. The steering torque data 16 corresponding to the original time intervals, to which a logical one has been assigned if the steering torque data 16 correspond to a hands-on condition, and a logical zero is assigned if the steering torque data 16 do not correspond to a hands-off condition, remain in this case.

These results 36 are stored by the driver assistance system 12 as labeled steering torque data 38. The labeled steering torque data 38 form training data 40 that can be used as explained in greater detail below.

Figure 2:
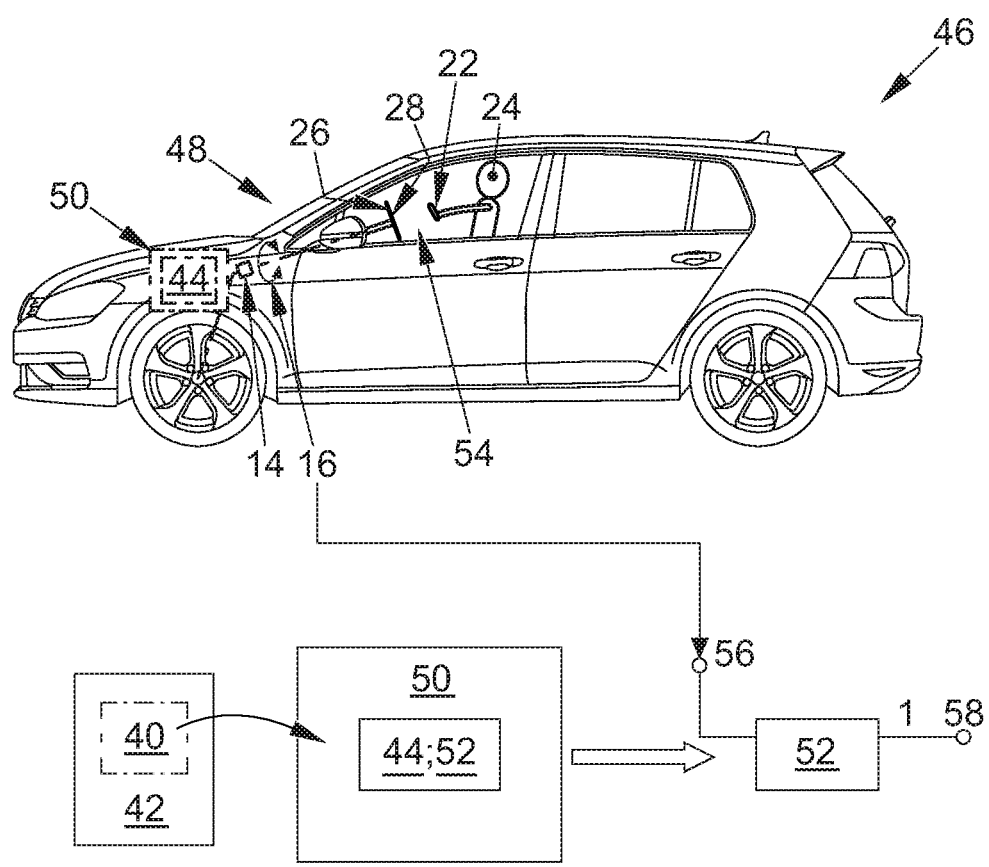
FIG. 2 shows a vehicle according to an example of a process according to the present disclosure for detecting a hands-off situation.

The training data 40 are used to train a driver assistance system 12, 48 (cf. FIG. 2) that can be configured as explained above, or can also be configured without a distance sensor 18, on the basis of an adaptive algorithm 44 (cf. FIG. 2).

FIG. 2 shows another vehicle 46 according to the present disclosure, which has a driver assistance system 48 according to the present disclosure. This vehicle 46 differs from the other vehicle 10 in that the driver assistance system 48 does not have a distance sensor.

The driver assistance system 48 does comprise an adaptive algorithm 44, however, which can also be provided in the driver assistance systems 12 in other exemplary embodiments. In this embodiment, the driver assistance system 12 is used for compiling training data 40, and the driver assistance system 48 uses these data as described below. When the driver assistance system 12 likewise comprises the adaptive algorithm 44, it can test the compiled training data 40 immediately with the adaptive algorithm 44. This approach corresponds analogously to the process described below.

The driver assistance system 48 in the present embodiment includes a control unit 50 on which the adaptive algorithm 44 is stored, or installed.

The driver assistance system 48 reads the training data 40, for example, from the data storage medium 42, and trains the adaptive algorithm 44 with the training data 40 such that a trained adaptive algorithm 52 is obtained. This is indicated in the block diagram beneath the vehicle 46.

A process according to the present disclosure can then be executed by the driver assistance system 48, in which a hands-off condition 54 is detected in the vehicle 46 on the basis of the trained adaptive algorithm 52.

The vehicle 46 is moving for this, and the driver assistance system 48 continues to record the steering torque data 16 with sensors while the vehicle is in motion.

The steering torque data 16 are input to the trained adaptive algorithm 52.

Because the trained adaptive algorithm 52, as explained above, has been trained to detect characteristics in the steering torque data 16, the trained adaptive algorithm 52 can output a [0055] logical one as the output data 58 in the case of a hands-off condition. Otherwise, a logical zero can be output.

The results regarding the existence of a hands-off condition 54 can then be further processed in a number of ways. By way of example, a warning signal can be output, or an automatic steering can be activated.

In the present embodiments described above, the vehicle 10 is particularly suitable for automatic compilation of the training data 40, in other words, as a development vehicle. The vehicle 46 makes an ideal end product, which does not need a distance sensor 18, and in which the functionality is only used for detecting a hands-off condition when the vehicle is being operated.

LIST OF REFERENCE SYMBOLS

10 vehicle
12 driver assistance system
14 steering torque sensor
16 steering torque data
18 distance sensor
20 distance data
22 hands
24 driver
26 steering wheel
28 surface
30 time stamp
32 intermediate result
34 intermediate result
36 result
38 labeled steering torque data
40 training data
42 data storage medium
44 adaptive algorithm
46 vehicle
48 driver assistance system
50 control unit
52 trained adaptive algorithm
54 hands-off condition
56 input data
58 output data

The invention claimed is:

1. A process for training a learning algorithm for a driver assistance system for a vehicle, comprising:
    recording, via first sensors, steering torque data for the vehicle;
    recording, via second sensors, distance data associated with a driver's hands and a steering wheel;
    detecting hands-off conditions for associated time intervals, based on at least the recorded distance data and one or more of (i) steering wheel movement data, (ii) data describing the course of the roadway, (iii) lane detection data, and/or (iv) vehicle movement data;
    linking the detected hands-off conditions with the recorded steering torque data for the time intervals; and
    compiling the linked hands-off conditions to generate labeled steering torque data, configured to be processed as training data for detecting future hands-off conditions in the learning algorithm for the vehicle.

2. The process of claim 1, wherein compiling the linked hands-off conditions comprises compiling data for the driver assistance system via an adaptive algorithm.

3. The process of claim 1, wherein the second sensors comprise capacitive distance sensors.

4. The process of claim 1, further comprising processing the compiled data in the driver assistance system for detecting future hands-off conditions for the vehicle.

5. The process of claim 1, wherein compiling the linked hands-off condition comprises storing the linked hand-off condition on a data storage medium and further comprising testing the stored data with an adaptive algorithm.

6. A system for training a learning algorithm for a driver assistance system for a vehicle, comprising:
    first sensor for recording steering torque data for the vehicle;
    second sensor for recording distance data associated with a driver's hands and a steering wheel;
    a storage medium for storing recorded steering torque data and distance data; and
    a control unit, operatively coupled to the storage medium, wherein the control unit and storage medium are configured to
        detect hands-off conditions for associated time intervals, based on at least the recorded distance data and one or more of (i) steering wheel movement data, (ii) data describing the course of the roadway, (iii) lane detection data, and/or (iv) vehicle movement data;
        link the detected hands-off conditions with the recorded steering torque data for the time intervals; and
        compile the linked hands-off conditions and generating labeled steering torque data, configured to be processed as training data for detecting future hands-off conditions in the learning algorithm for the vehicle.

7. The system of claim 6 wherein the control unit and storage medium are configured to compile the linked hands-off conditions by compiling data for the driver assistance system via an adaptive algorithm.

8. The system of claim 6, wherein the second sensor comprises a capacitive distance sensor.

9. The system of claim 6, wherein the control unit and storage medium are configured to process the compiled data in the driver assistance system for detecting future hands-off conditions for the vehicle.

10. The system of claim 6, wherein the control unit and storage medium are configured to test the stored data with an adaptive algorithm.

11. An article of manufacture for training a learning algorithm for a driver assistance system for a vehicle, the article comprising:
    a non-transitory computer-readable medium having stored therein instructions executable by one or more processors to:
        record, via first sensors, steering torque data for the vehicle;
        record, via second sensors, distance data associated with a driver's hands and a steering wheel;
        detect hands-off conditions for associated time intervals, based on at least the recorded distance data and one or more of (i) steering wheel movement data, (ii) data describing the course of the roadway, (iii) lane detection data, and/or (iv) vehicle movement data;

link the detected hands-off conditions with the recorded steering torque data for the time intervals; and compile the linked hands-off conditions and generating labeled steering torque data, configured to be processed as training data for detecting future hands-off conditions in the learning algorithm for the vehicle.

12. The article of manufacture of claim 11, wherein the non-transitory computer-readable medium compiles the linked hands-off conditions by compiling data for the driver assistance system via an adaptive algorithm.

13. The article of manufacture of claim 11, wherein the second sensors comprise capacitive distance sensors.

14. The article of manufacture of claim 11, wherein the non-transitory computer-readable medium processes the compiled data in the driver assistance system for detecting future hands-off conditions for the vehicle.

15. The article of manufacture of claim 11, wherein the non-transitory computer-readable medium compiles the linked hands-off condition by storing the linked hand-off condition on a data storage medium and further comprising testing the stored data with an adaptive algorithm.

\* \* \* \* \*